US012592101B2

(12) United States Patent
Ohkubo et al.

(10) Patent No.: US 12,592,101 B2
(45) Date of Patent: Mar. 31, 2026

(54) INFORMATION COMMUNICATION DEVICE OF VEHICLE, INFORMATION MANAGEMENT SERVER, AND INFORMATION COMMUNICATION SYSTEM

(71) Applicant: TOYOTA JIDOSHA KABUSHIKI KAISHA, Toyota (JP)

(72) Inventors: Tadashi Ohkubo, Toyota (JP); Shuhei Yamaguchi, Nisshin (JP); Koichi Kase, Kodaira (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 184 days.

(21) Appl. No.: 18/503,508

(22) Filed: Nov. 7, 2023

(65) Prior Publication Data

US 2024/0233456 A1 Jul. 11, 2024

(30) Foreign Application Priority Data

Jan. 10, 2023 (JP) ................................ 2023-001541

(51) Int. Cl.
*B60W 40/00* (2006.01)
*F02D 41/00* (2006.01)
*G07C 5/00* (2006.01)
*G07C 5/08* (2006.01)

(52) U.S. Cl.
CPC .......... *G07C 5/008* (2013.01); *G07C 5/0816* (2013.01)

(58) Field of Classification Search
CPC ..... H04L 67/12; H04L 67/52; F02D 19/0657; F01N 2900/1402; F01N 2900/10; F01N 2590/00; F01N 2570/04; F01N 2560/027; F01N 11/00; H04Q 9/00; G07C 5/0816; G07C 5/008; G06Q 50/26; G06Q 50/40; G06Q 50/06; G06Q 30/0201; G06Q 10/20; G01N 33/0042
See application file for complete search history.

(56) References Cited

U.S. PATENT DOCUMENTS

| | | | |
|---|---|---|---|
| 2015/0371460 | A1* | 12/2015 | Wenzel et al. |
| 2018/0114378 | A1* | 4/2018 | Slusar |
| 2018/0238246 | A1* | 8/2018 | Light-Holets |

FOREIGN PATENT DOCUMENTS

| | | | | |
|---|---|---|---|---|
| CN | 111770141 | B | * | 6/2020 |
| JP | 2000-274229 | A | | 10/2000 |
| JP | 2013-087630 | A | | 5/2013 |
| JP | 2016156283 | A | * | 2/2015 |
| WO | WO2008007007 | A1 | * | 7/2007 |

* cited by examiner

*Primary Examiner* — Christian Chace
*Assistant Examiner* — Shane Emanuel Douglas
(74) *Attorney, Agent, or Firm* — SoraIP, Inc.

(57) ABSTRACT

To acquire information on the refueling position when a vehicle is refueled. A $SO_2$ sensor detects the concentration of sulfur dioxide in the exhaust gas of the internal combustion engine after refueling. Region-by-region concentration information that associates refueling position information with information obtained by averaging sulfur dioxide concentration is transmitted to the data center. As a result, it is possible to accumulate information reflecting the properties of fuel distributed in each area in real time in the data center.

8 Claims, 2 Drawing Sheets

INFORMATION COMMUNICATION DEVICE OF VEHICLE, INFORMATION MANAGEMENT SERVER, AND INFORMATION COMMUNICATION SYSTEM

CROSS-REFERENCE TO RELATED APPLICATION

This application claims priority to Japanese Patent Application No. 2023-001541 filed on Jan. 10, 2023, incorporated herein by reference in its entirety.

BACKGROUND

1. Technical Field

The present disclosure relates to an information communication device of a vehicle, an information management server, and an information communication system. In particular, the present disclosure relates to measures for effective use of information acquired by a vehicle.

2. Description of Related Art

Conventionally, there has been a demand to know in advance the sulfur content of fuel in a fuel tank mounted on a vehicle. An example of the reason why it is desirable to know the sulfur content in advance will be described. In a catalytic device provided in an exhaust system of an engine (internal combustion engine) mounted on the vehicle, removal performance deteriorates when precious metals in the catalytic device are poisoned by sulfur contained in the fuel. In order to suppress the poisoning by the sulfur, as disclosed in Japanese Unexamined Patent Application Publication No. 2016-156283 (JP 2016-156283 A), for example, sulfur purge control is executed to periodically remove the sulfur accumulated in the catalytic device. In this control, it is necessary to raise the temperature of the catalytic device in order to remove the sulfur, so it is necessary to raise the temperature of the exhaust gas, resulting in deterioration of fuel efficiency. For this reason, it is desirable to grasp the sulfur content of the fuel in the fuel tank in advance and optimize the execution interval of the sulfur purge control.

However, the sulfur content of the fuel differs from region to region. JP 2016-156283 A discloses that the data of the sulfur content of a refueling region corresponding to a refueling position is acquired from a database provided outside the vehicle, and based on the acquired sulfur content data, the sulfur content of the fuel in the fuel tank is estimated, and the execution interval of the sulfur purge control is determined from the sulfur content.

SUMMARY

However, although JP 2016-156283 A discloses that the database of the sulfur content of the refueling region stored in advance on the Internet is used, means for updating the database to the latest version is not disclosed.

The inventors of the present disclosure paid attention to the fact that the sulfur content of fuel distributed for each region may vary. The inventors considered that in order to estimate the sulfur content of the fuel in the fuel tank with high accuracy, it is necessary to create a database that reflects this variation in real time.

The present disclosure has been made in view of the above points, and an object of the present disclosure is to provide an information communication device of a vehicle, an information management server, and an information communication system capable of reflecting in real time the sulfur content of the fuel distributed for each region.

The solution of the present disclosure for achieving the above object is on the premise of an information communication device of a vehicle that is mounted on a vehicle including an internal combustion engine as a driving force source for traveling and transmits information to an information management server. The information communication device includes:

- a refueling detection unit for detecting that the vehicle has been refueled;
- a refueling position information acquisition unit for acquiring refueling position information that is information on a vehicle position when the refueling detection unit detects that the vehicle has been refueled;
- a concentration detection unit for detecting concentration of sulfur dioxide in an exhaust gas of the internal combustion engine after the vehicle has been refueled; and
- an information transmission unit for transmitting, to the information management server, concentration information for each region in which the refueling position information acquired by the refueling position information acquisition unit is associated with concentration information of the sulfur dioxide detected by the concentration detection unit or concentration analysis information of the sulfur dioxide obtained from the information.

According to this specific matter, when the exhaust gas is generated by the operation of the internal combustion engine after the vehicle is refueled, the concentration of the sulfur dioxide in the exhaust gas is detected by the concentration detection unit. In this case, the detected concentration of the sulfur dioxide is greatly affected by the properties of the fuel refueled at the refueling position acquired by the refueling position information acquisition unit. That is, by transmitting, to the information management server, the information in which the refueling position information is associated with the concentration information of the sulfur dioxide or the concentration analysis information of the sulfur dioxide obtained from the information, information that reflects the sulfur content of the fuel distributed for each region can be accumulated in the information management server.

Further, the concentration analysis information of the sulfur dioxide is information obtained by averaging the concentration of the sulfur dioxide detected during a period from when the vehicle has been refueled to when the vehicle is refueled next time.

As a result, it becomes possible to generate the concentration information for each region in which highly reliable sulfur dioxide concentration information is associated with refueling position information, and accumulate the information in the information management server.

Further, an information management server that receives the concentration information for each region from the information communication device is also within the scope of the technical idea of the present disclosure. This information management server includes a storage unit for generating and storing information on a sulfur content of fuel distributed for each region based on the received concentration information for each region.

As a result, the information on the sulfur content of the fuel distributed for each region is stored in the storage unit of the information management server. Since this information is updated each time the concentration information for each region is received from the information communication device of the vehicle, the information that reflects the sulfur content of the fuel distributed for each region in real time can be accumulated in the information management server.

An information communication system constructed by the information communication device and the information management server is also within the scope of the technical idea of the present disclosure. This information communication system is constructed by a plurality of the vehicles each equipped with the information communication device, and the information management server. The information management server receives and stores the concentration information for each region from each of the vehicles via a communication network.

As a result, it is possible to construct the information communication system capable of storing, in the information management server, the information that reflects the sulfur content of the fuel distributed for each region in real time.

In the present disclosure, the concentration information for each region in which the refueling position information when the vehicle has been refueled is associated with the concentration information of the sulfur dioxide in the exhaust gas of the internal combustion engine after refueling or the concentration analysis information of the sulfur dioxide obtained from the information is transmitted to the information management server. Therefore, it is possible to accumulate in the information management server the information that reflects the sulfur content of the fuel distributed for each region in real time.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the drawings. In the present embodiment, a case where an information communication device according to the present disclosure is installed in a conventional vehicle equipped with an internal combustion engine as a driving force source will be described as an example. Not limited to this, the information communication device according to the present disclosure can also be mounted on a hybrid electric vehicle or a plug-in hybrid electric vehicle.

Outline Configuration of Information Communication System

Figure 1:
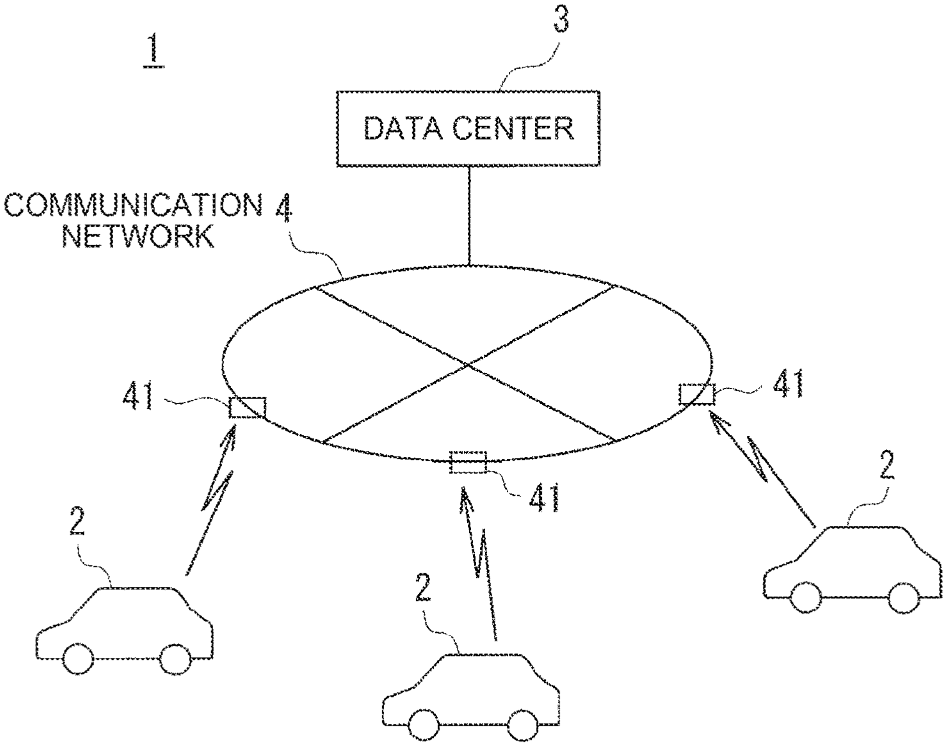
FIG. 1 is a diagram showing a schematic configuration of an information communication system according to an embodiment.

FIG. 1 is a diagram showing a schematic configuration of an information communication system 1 according to this embodiment. As shown in FIG. 1, an information communication system 1 is constructed including a plurality of vehicles 2, 2, . . . , and a data center (information management server) 3. Each vehicle 2, 2, . . . and data center 3 are configured to be able to communicate with each other via a communication network 4 such as the Internet or a telephone line. More specifically, each vehicle 2, 2, . . . is connected to the communication network 4 through base stations 41, 41 of the communication network 4, and can communicate with the data center 3.

Figure 2:
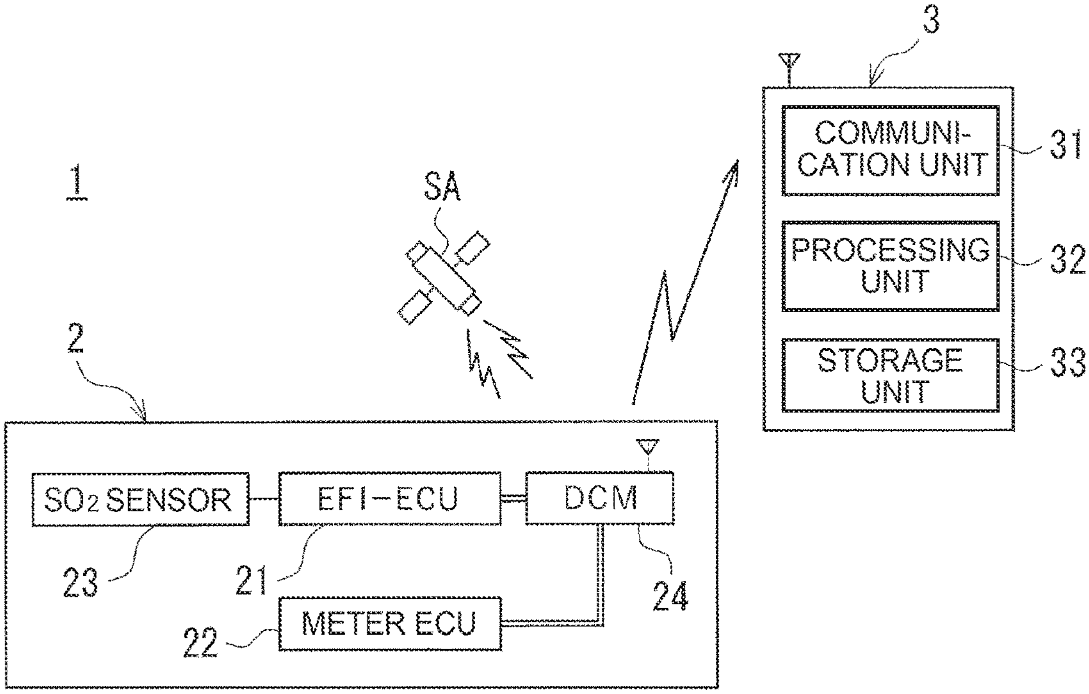
FIG. 2 is a functional block diagram of the information communication system according to the embodiment.

FIG. 2 is a functional block diagram of the information communication system 1. As shown in FIG. 2, the vehicle 2 includes a plurality of ECUs 21 and 22 that control various devices mounted on the vehicle. FIG. 2 shows only the Electronic Fuel injection-Electronic Control Unit (EFI-ECU) 21 and the meter ECU 22 among these multiple ECUs. These ECUs 21 and 22 are implemented by a computer including a Central Processing Unit (CPU), Random Access Memory (RAM), Read Only Memory (ROM), clock generator, input/output interface, communication interface, internal bus, and the like.

The EFI-ECU 21 is a control device that electronically controls the amount of fuel supplied to the engine. Further, the output of the engine is controlled by controlling the fuel supply amount, ignition timing, air intake amount, and the like.

The meter ECU 22 is a control device that controls the display of a meter display unit (not shown) provided on an instrument panel (not shown) in front of the vehicle interior. The meter display unit includes display devices such as an odometer/trip meter, water temperature meter, remaining fuel meter, tachometer, clock, speedometer, etc., and the display state of each display device is controlled based on commands from the meter ECU 22.

An $SO_2$ sensor 23 is provided in the exhaust system of the engine mounted on the vehicle 2. This $SO_2$ sensor 23 detects the concentration of sulfur dioxide ($SO_2$) in the exhaust gas. Therefore, the $SO_2$ sensor 23 corresponds to the concentration detection unit of the present disclosure.

The vehicle 2 also includes a Data Communication Module (DCM) 24 that transmits and receives information to and from the data center 3. This DCM 24 is a communication device that performs two-way communication between the vehicle 2 and the data center 3 through the communication network 4, as is well known.

As functions of the EFI-ECU 21, the meter ECU 22, and the DCM (information transmission unit) 24 according to the present disclosure, the EFI-ECU 21 receives the output of the $SO_2$ sensor 23 (the concentration of sulfur dioxide in the exhaust gas), the sulfur dioxide concentration is averaged. The averaging process employed here is not limited to the simple moving average process, and may be a weighted moving average process or an exponential moving average process.

Further, the meter ECU 22 determines that fuel supply (refueling) to the vehicle 2 has been performed. That is, the fuel tank accommodates a float that moves up and down according to the height of the fuel level, and the meter ECU 22 outputs a detection signal corresponding to the position of this float (the height of the fuel level in the fuel tank). The meter ECU 22 receives this detection signal and determines that the vehicle 2 has been refueled if the change in the float position is greater than or equal to a predetermined value. Therefore, the meter ECU 22 corresponds to the refueling detection unit of the present disclosure.

These EFI-ECU 21, meter ECU 22, $SO_2$ sensor 23 and DCM 24 are connected by signal lines (wired connections) to enable two-way communication through an in-vehicle network based on communication protocols such as Controller Area Network (CAN) and Ethernet.

The DCM 24 incorporates a GPS reception function that identifies the position of the vehicle 2 based on radio waves from the satellite SA. Therefore, when the meter ECU 22 determines that the vehicle 2 has been refueled, it is possible to obtain refueling position information by specifying the position of the vehicle 2 using the GPS reception function. Therefore, the DCM 24 corresponds to the refueling position information acquisition unit of the present disclosure. A GPS module may be provided separately from the DCM 24, and the DCM 24 may receive vehicle position information from the GPS module.

The information transmitted from the DCM 24 to the data center 3 includes location information of refueling when the meter ECU 22 determines that refueling has been performed (location information of the own vehicle obtained by the GPS reception function), and then the information on the averaging processing of the sulfur dioxide concentration calculated by the EFI-ECU 21 are associated with each area concentration information. Although there are no particular restrictions on the classification by region, examples thereof include classification by prefectures and classification by municipalities. Alternatively, the classification may be based on the partnership between the oil wholesaler and the dealer (gas station).

The process of averaging the concentration of sulfur dioxide by the EFI-ECU 21 is repeated at predetermined time intervals. Therefore, when the averaging process is performed a plurality of times during the period from when the vehicle 2 is refueled to when the next refueling is performed, the averaging process may not be performed for the same position information. The information of the average value of the concentration of sulfur dioxide obtained each time is updated and stored in the EFI-ECU 21. At the timing of the next refueling, the latest information of the sulfur dioxide concentration average value is transmitted to the data center 3 as regional concentration information associated with the refueling position information.

With the configuration as described above, in this embodiment, the EFI-ECU 21, the meter ECU 22, the $SO_2$ sensor 23 and the DCM 24 constitute the information communication device referred to in the present disclosure.

The data center 3 communicates with the vehicles 2, 2, . . . through the communication network 4, and exchanges various information with the vehicles 2, 2, . . . .

The data center 3 includes a communication unit 31, a processing unit 32 and a storage unit 33.

The communication unit 31 performs two-way data communication with each of the vehicles 2, 2, . . . through the communication network 4 (see FIG. 1). Specifically, the region-specific concentration information is repeatedly received from each vehicle 2, 2, . . . every predetermined time.

The processing unit 32 uses the regional concentration information received from each of the vehicles 2, 2, . . . . For example, when receiving regional concentration information related to region A from the vehicle 2, the sulfur content of the fuel calculated for the region A and the carbon dioxide contained in the newly received region-specific concentration information The average value of the sulfur content obtained from the information on the sulfur concentration averaging process is defined as the sulfur content of the new fuel in the region A. Also, the sulfur content rate obtained from the information about the sulfur dioxide concentration averaging process included in the area-by-area concentration information newly received this time may be overwritten as the latest information for the area.

The storage unit 33 updates and stores the sulfur content rate of the fuel in each region defined in this way.

The information on the sulfur content of fuel stored in the storage unit 33 of the data center 3 in this manner is used in various ways. For example, information on the sulfur content of the fuel in the relevant area is transmitted to the vehicle 2 that has been refueled, and the information is used to determine the execution interval of the sulfur purge control in the vehicle 2. In addition, disclosing it on the Internet and making it available to the general public can also be mentioned.

Information Processing Procedure

Figure 3:
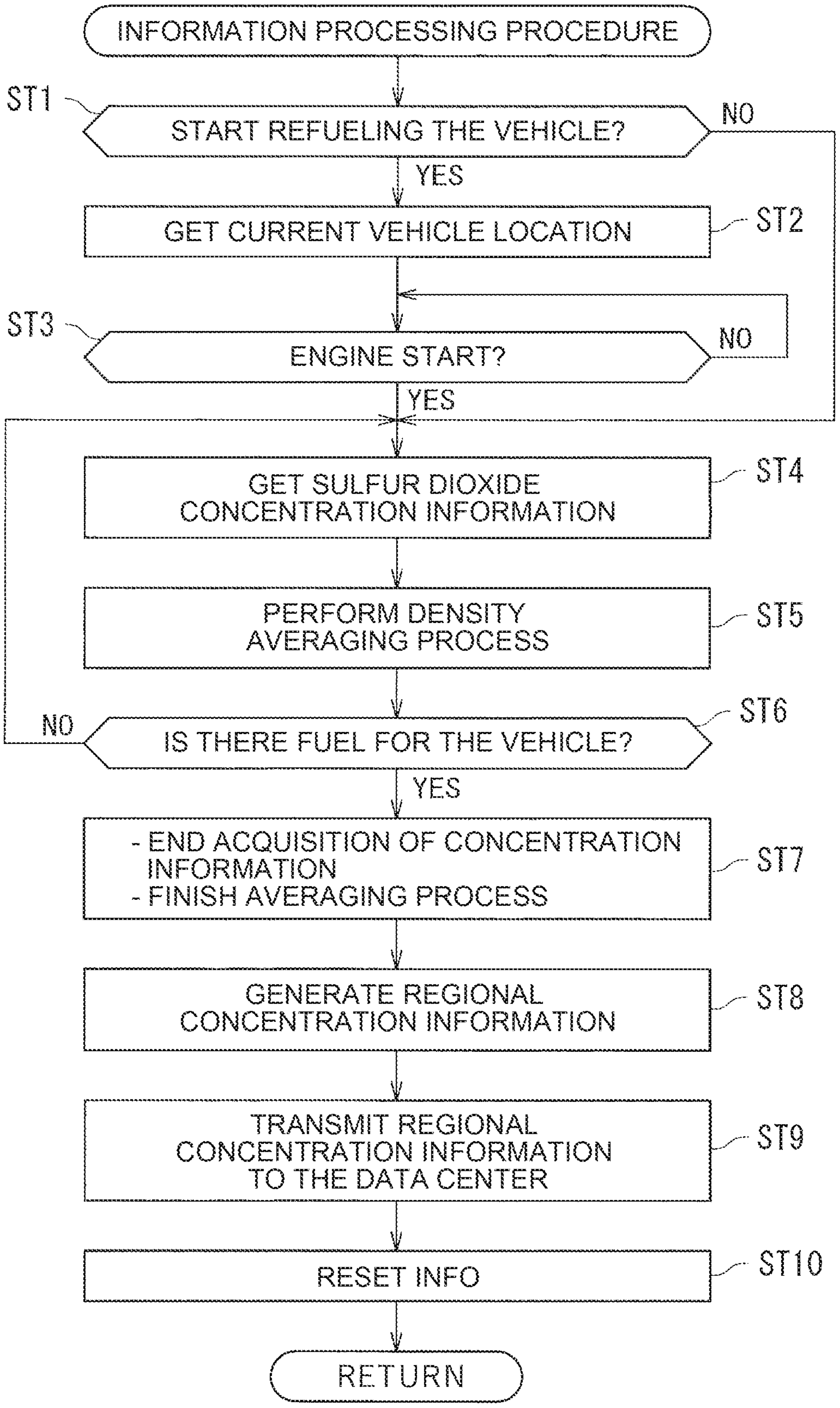
FIG. 3 is a flowchart for explaining the information processing procedure in the vehicle according to the embodiment.

Next, an information processing procedure in the vehicle 2 in the information communication system 1 configured as described above will be described. FIG. 3 is a flowchart for explaining the information processing procedure in this vehicle 2.

First, in ST 1, it is determined whether or not fueling to the vehicle 2 has been started. This determination is made by the meter ECU 22 as described above.

When refueling to the vehicle 2 is started and the determination in ST 1 is YES, the process proceeds to ST 2 to acquire the current position information of the vehicle 2. Acquisition of this positional information is performed based on radio waves from the artificial satellite SA. As a result, the information that the vehicle 2 has been refueled and the information of the location where the refueling has been performed are obtained.

After that, in ST 3, it is judged whether the engine has started. If the judgment in ST 3 is YES because the engine has started, the process proceeds to ST 4, and the concentration of sulfur dioxide in the exhaust gas detected by the $SO_2$ sensor 23 acquisition is started.

After that, in ST 5, the EFI-ECU 21 performs an averaging process of the newly acquired concentration of sulfur oxide and the concentration of sulfur oxide acquired so far. The average value (updated average value) of the concentration of sulfur dioxide calculated in this manner is stored in the memory means of the vehicle 2 (for example, the RAM of the EFI-ECU 21).

After that, in ST 6, it is determined whether or not refueling to the vehicle 2 has been started again. This determination is also made by the meter ECU 22 as in the case of ST 1. During the period in which refueling to the vehicle 2 has not started and a NO determination is made in ST 6, the acquisition operation of the concentration of sulfur dioxide in the exhaust gas in ST 4 and the average concentration of sulfur oxide in ST 5 are repeatedly performed. By repeating this operation, the latest average value of the concentration of sulfur dioxide is stored in the memory means of the vehicle 2.

If a YES determination is made in ST 6 because refueling of the vehicle 2 has started, the process proceeds to ST 7, where the acquisition operation of the concentration of sulfur dioxide in the exhaust gas is terminated, and the average concentration of sulfur oxide is also terminated.

Then, in ST 7, regional concentration information is generated in which the currently calculated average sulfur dioxide concentration and the location information of the vehicle 2 acquired in ST 2 are associated (linked).

Then, in ST 9, this regional concentration information is transmitted from the DCM 24 to the data center 3. Further, in ST 10, the position information of the vehicle 2 stored in ST 2 and the average sulfur dioxide concentration information stored in ST 5 are reset and stored as information for refueling in ST 6. In other words, the determination in ST 6 that refueling has started is treated as the determination in ST 1 that refueling to the vehicle 2 has started, and the above operations are repeated.

The above operation is repeated between each vehicle 2, 2, . . . and the data center 3.

Effect of Embodiment

As described above, in the present embodiment, region-specific concentration information that associates information on the location of fueling when the vehicle 2 is refueled with information on the concentration of sulfur dioxide in the exhaust gas of the internal combustion engine after refueling is generated. The information is transmitted to the data center 3 and stored in the data center 3. For this reason, it is possible to accumulate in the data center 3 information that reflects the sulfur content of fuel distributed in each region in real time.

Further, in the present embodiment, regional concentration information is generated using information obtained by averaging the concentrations of sulfur dioxide detected during the period from when the vehicle 2 is refueled to when the next refueling is performed. As a result, it becomes possible to generate region-specific concentration information in which highly reliable sulfur dioxide concentration information is associated with refueling position information, and accumulate the information in the data center 3.

Other Embodiments

It should be noted that the present disclosure is not limited to the above-described embodiment, and all modifications and applications included in the claims and the range equivalent to the claims can be applied.

For example, in the above embodiment, after the concentration of sulfur dioxide detected by the $SO_2$ sensor 23 is averaged in the EFI-ECU 21, the information is transmitted to the data center 3. The present disclosure is not limited to this, and the value of the concentration of sulfur dioxide detected by the $SO_2$ sensor 23 is transmitted to the data center 3 each time it is detected without averaging the concentration of sulfur dioxide detected by the $SO_2$ sensor 23. Alternatively, the concentration values may be collectively transmitted to the data center 3 at the next refueling time.

Further, in the above embodiment, a case has been described in which regional concentration information accumulated in the data center 3 is used as information for determining the execution interval of sulfur purge control in each of the vehicles 2, 2, . . . . The present disclosure is not limited to this, and can be applied to other forms of usage.

Further, in the above-described embodiment, the meter ECU 22 is provided with the function of refueling detection unit, and the DCM 24 is provided with the function of refueling position information acquisition unit. The present disclosure is not limited to this, and an individual ECU having a function as the refueling detection unit and a function as the refueling position information acquisition unit may be provided.

The present disclosure is applicable to an information communication system capable of accumulating in a data center information that reflects the sulfur content of fuel distributed in each area in real time.

What is claimed is:

1. An information communication device that is mounted on a vehicle including an internal combustion engine as a driving force source for traveling and that is configured to transmit information to an information management server, the information communication device comprising:

a first processor configured to determine that refueling of the vehicle is started in response to receiving a detection signal indicating a fuel level in a fuel tank of the vehicle;

a data communication module configured to communicate with the information management server, wherein the data communication module is further configured to receive a GPS signal and identify a refueling position where the vehicle is being refueled in a region based on the GPS signal in a case where the first processor has determined that the refueling of the vehicle is started;

a sensor configured to measure sulfur dioxide concentration in an exhaust gas produced by the internal combustion engine after the vehicle has been refueled;

a memory; and a second processor configured to calculate an average value of the sulfur dioxide concentration at predetermined time intervals during a period between a time the first processor determined that the refueling of the vehicle is started and a time the first processor determines that a subsequent refueling of the vehicle is started, wherein the second processor calculates the average value by averaging the sulfur dioxide concentration previously acquired from the sensor with latest sulfur dioxide concentration, store the calculated average value in the memory as an updated average value of the sulfur dioxide concentration associated with the refueling position, and stop calculating the average value in a case where the first processor has determined that the subsequent refueling of the vehicle is started, wherein the data communication module is further configured to transmit the updated average value of the sulfur dioxide concentration associated with the refueling position to the information management server as sulfur dioxide concentration information for the region in the case where the first processor has determined that the subsequent refueling of the vehicle is started, so that the sulfur dioxide concentration information for the region is reflected in real time in data accumulated on the information management server.

2. An information management server that receives sulfur dioxide concentration information for each region from the information communication device according to claim 1, the information management server comprising a storage unit configured to store information on a sulfur content of fuel distributed for each region, the information on the sulfur content being generated based on an updated average value of sulfur dioxide concentration associated with a refueling position of a vehicle in a region received from the information communication device as the sulfur dioxide concentration information for the region, wherein the information on the sulfur content stored in the storage unit is overwritten with latest information on the sulfur content each time the updated average value of the sulfur dioxide concentration is received from the information communication device to reflect latest sulfur dioxide concentration information for the region in real time.

3. An information communication system, comprising a plurality of vehicles each equipped with the information communication device according to claim 1, and an information management server that receives sulfur dioxide concentration information for each region from the information communication device via a communication network, wherein the information management server comprises a storage unit configured to store information on a sulfur content of fuel distributed for each region, the information on the sulfur content being generated based on an updated average value of sulfur dioxide concentration associated with a refueling position of the vehicle in a region received from the information communication device as the sulfur dioxide concentration information for the region, and the information on the sulfur content stored in the storage unit is overwritten with latest information on the sulfur content each time the updated average value of the sulfur dioxide concentration is received from the information communication device to reflect latest sulfur dioxide concentration information for the region in real time.

4. The information management server according to claim 2, wherein the information on the sulfur content of the fuel is transmitted to the vehicle to prompt the vehicle to execute sulfur purge control at an execution interval determined based on the transmitted information on the sulfur content of the fuel.

5. The information management server according to claim 2, wherein the stored information on the sulfur content of the fuel distributed for each region is made available to the general public via Internet.

6. The information communication device according to claim 1, wherein the average value stored in the memory as the updated average value of the sulfur dioxide concentration associated with the refueling position is reset with an average value of sulfur dioxide concentration calculated for a subsequent refueling position after the first processor has determined that the subsequent refueling of the vehicle is started.

7. The information communication device according to claim 1, wherein the region is a municipality, and the sulfur dioxide concentration information for the region transmitted to the information management server is the sulfur dioxide concentration information for the corresponding municipality.

8. The information communication device according to claim 1, wherein the second processor is further configured to continue calculating the average value of the sulfur dioxide concentration at the predetermined time intervals and storing the calculated average value in the memory as the updated average value of the sulfur dioxide concentration associated with the refueling position until the first processor determines that the subsequent refueling of the vehicle is started.

* * * * *